Jan. 26, 1954
C. S. JACOBS
2,667,347
COMBINED LINER AND COVER FOR LEAF SPRINGS
Filed Oct. 25, 1950
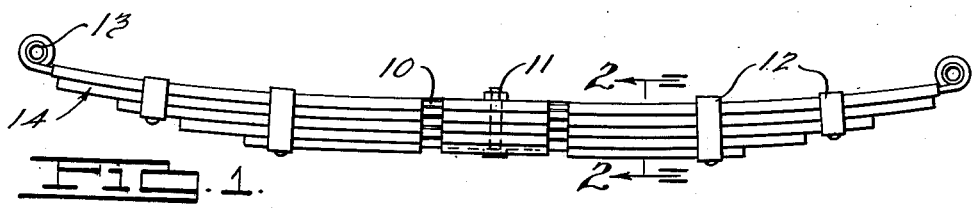
FIG. 1.
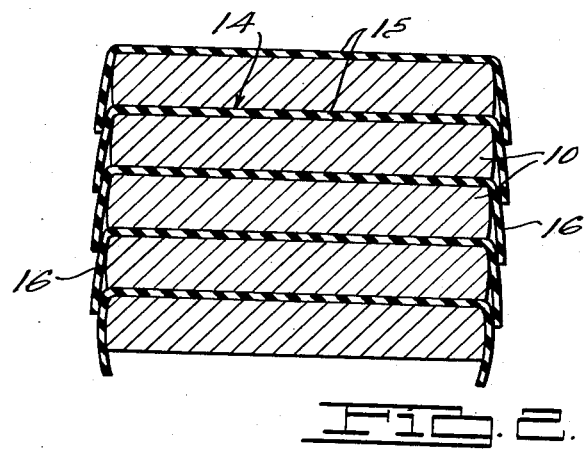
FIG. 2.
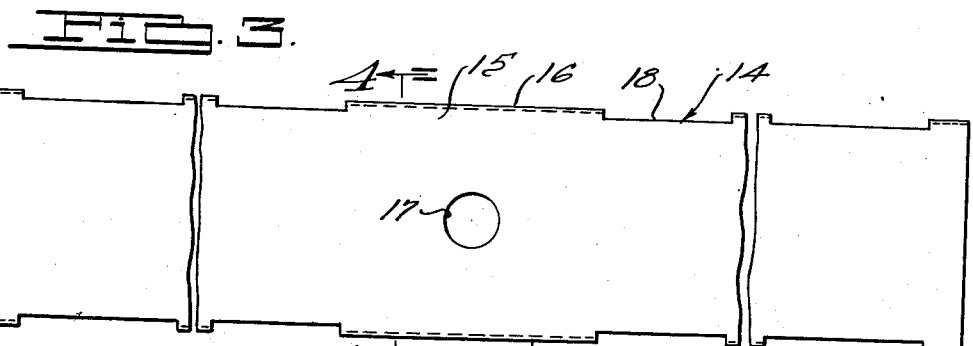
FIG. 3.
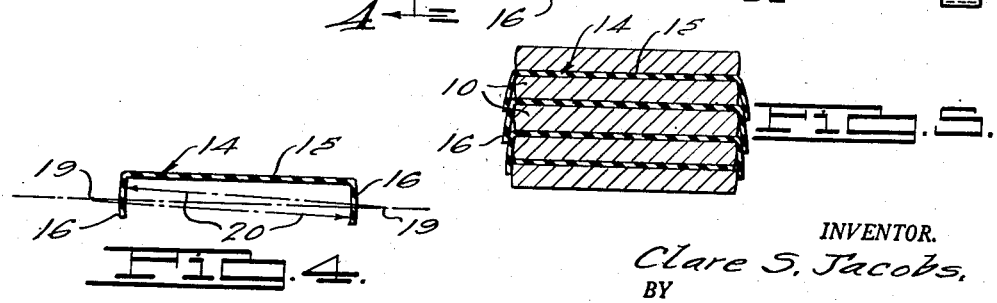
FIG. 4.
FIG. 5.
INVENTOR.
Clare S. Jacobs,
BY
Maxwell K. Murphy
ATTORNEY.

Patented Jan. 26, 1954

2,667,347

UNITED STATES PATENT OFFICE 2,667,347

COMBINED LINER AND COVER FOR LEAF SPRINGS

Clare S. Jacobs, Grosse Pointe, Mich., assignor to F. L. Jacobs Co., Detroit, Mich., a corporation of Michigan Application October 25, 1950, Serial No. 192,117

2 Claims. (Cl. 267—37)

This invention relates to a combined liner and cover for laminated or leaf springs, particularly springs such as those used in automobiles and railway rolling stock.

During recent years it has been customary to cover automobile suspension springs of the leaf type with metal covers having an inside liner of canvas impregnated with lubricant. The liner is simply wrapped around the spring for retaining the lubricant and does not extend between the leaves.

In instances where covers are not used, liners or inserts of rubber-like or lubricant impregnated material are disposed between the spring laminations. In both instances, the object is to prevent entry of grit and dirt between the leaves and to facilitate sliding of the leaves during flexing of the spring. Both covers and liners have advantages, and it is generally recognized that use of both in combination would be especially advantageous, but cost has discouraged such use.

An object of the present invention is to provide a low-cost combined spring cover and liner which covers the spring, thereby protecting it from entry of dirt and water between leaves, and in addition separates the leaves from one another by a layer of anti-friction material.

Another object is to provide a spring liner which does not require addition of lubricant.

Other objects and advantages will appear from the following specification which describes a preferred form of the invention.

In the drawings accompanying the specification:

Fig. 1 is an elevation of a leaf spring covered with the combined cover and liner described herein;

Fig. 2 is a sectional view on an enlarged scale along line 2—2 of Fig. 1;

Fig. 3 is a plan view of a single liner as shown in Fig. 2;

Fig. 4 is a sectional view, on a reduced scale, of a liner showing the curved side portions thereof; and Fig. 5 is a sectional view, on a similarly reduced scale, of a spring with less coverage than that of Figs. 1 and 2.

Figs. 1 and 2 show a leaf spring assembly comprising leaves 10, kingbolt 11 and clips 12. The top leaf is provided with eyes 13 for attachment to the chassis of a vehicle. The kingbolt 11 maintains the leaves in assembly and the clips 12 prevent the leaves from misalignment.

In the example being discussed, a liner 14 is disposed between each pair of leaves and over the top leaf. The liner is of channel shape and has a central portion 15 extending lengthwise substantially co-extensively with the leaf on which it rests, and overlapping side portions 16 which extend downwardly a sufficient distance to partially overlap the liner immediately below.

The liners have cut-outs where necessary, as indicated at 17 and 18, to accommodate the kingbolt, U-bolts (not shown) and spring clamps. The amount of overlap of the side portions 16 is not critical, but in general should be sufficient to maintain a gap-free relationship between the liner at the sides of the spring during flexing of the spring in normal use.

While various materials have been found satisfactory for use as spring liners, I prefer to use extruded polyethylene. Polyethylene is commercially obtainable on the open market and may be molded or extruded in standard plastic handling apparatus. The material in its solid state has a waxy surface which is resistant to effect of the elements, is self lubricating to a considerable extent and maintains a substantially constant friction characteristic. This latter feature is important in a spring liner in that it tends to prolong the built-in ride characteristic of the suspension system.

Fig. 4 illustrates in section a single combined cover and liner for a single spring leaf. The material is extruded through a die formed to provide an arcuate shape to the side portions 16. In the particular modification shown, the points 19 represent the center of the arc for the sides, the radius in each case being represented by the lines 20. This construction makes the cover liner tend to grip the sides of the leaves and seal the spaces between leaves against entry of dirt.

The combined cover and liner is assembled along with the spring leaves and provides a cover for excluding dirt and grit as well as a self lubricating liner, which under normal circumstances of use will last the life of the spring without attention or service.

If desired, the liner may be omitted at the top of the spring as shown in Fig. 5. Also, if desired, the liner between the bottom and adjacent leaf may have the side portions omitted as shown. This construction is somewhat more economical but does not, of course, completely cover the spring.

While I have shown for illustrative purposes only preferred embodiments of my invention, it will be understood that by so doing, I do not intend to limit the same to the precise construction, material or relative size shown, but only as set out in the appended claims.

I claim:
1. A cover and liner for a leaf spring assembly comprising, a strip of extruded polyethylene arranged between two of the leaves of said spring assembly having a width substantially equal to the width of the leaves, a second strip of extruded polyethylene arranged between one of said leaves and a third leaf of said spring assembly having a width substantially equal to the width of said leaves, a side portion integral with each edge of both of said strips formed during extrusion of the polyethylene and continuous throughout major lengthwise portions of the strips, each side portion depending from its strip substantially at right angles and having a height greater than the thickness of any one leaf of the spring assembly, and the normal horizontal distance between inner surfaces of lower edges of the side portions carried by each strip being slightly less than the distance between the outer surfaces of the side portions carried by the other strip so that the side portions of one strip remain in overlapped engagement with side portions of the next strip, said first and second mentioned strips being provided with cutout portions to accommodate means for securing the elements of said assembly together and being otherwise unapertured.

2. A cover and liner for a leaf spring assembly comprising, a relatively thin strip of extruded generally polyethylene arranged between two of the leaves of said spring assembly having a width substantially equal to the width of the leaves, a second strip of extruded generally polyethylene arranged between one of the first leaves and a third leaf of said spring assembly having a width substantially equal to the width of said leaves, a side portion integral with each edge of both of said strips formed during extrusion of the polyethylene and being continuous throughout major lengthwise portions of said strips, each side portion having a thickness substantially equal to that of its strip and depending therefrom substantially at right angles and having a width slightly greater than the thickness of any one leaf of said spring assembly, said side portions being arcuate shaped and having concave inner faces, and the distance between the inner surfaces of the free edges of the side portions carried by one strip being less than the distance between the outer surfaces of the side portions carried by the other strip so that the side portions overlap and remain in engagement, said first and second mentioned strips being provided with cutout portions to accommodate means for securing the elements of said assembly together and being otherwise unapertured.

CLARE S. JACOBS.

References Cited in the file of this patent

UNITED STATES PATENTS

| Number | Name | Date |
|---|---|---|
| 1,615,065 | Blackburn | Jan. 18, 1927 |
| 1,967,088 | Geyer | July 17, 1934 |
| 2,246,086 | Austin | June 17, 1941 |
| 2,246,092 | Gilman | June 17, 1941 |